June 25, 1935.  P. S. MORGAN  2,005,949
VERNIER FOR METER REGISTERING MECHANISM
Original Filed June 3, 1932
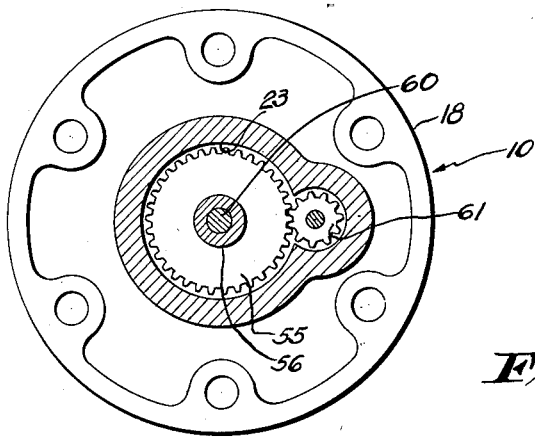
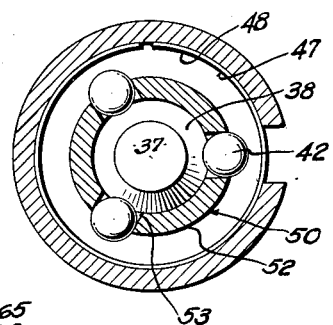
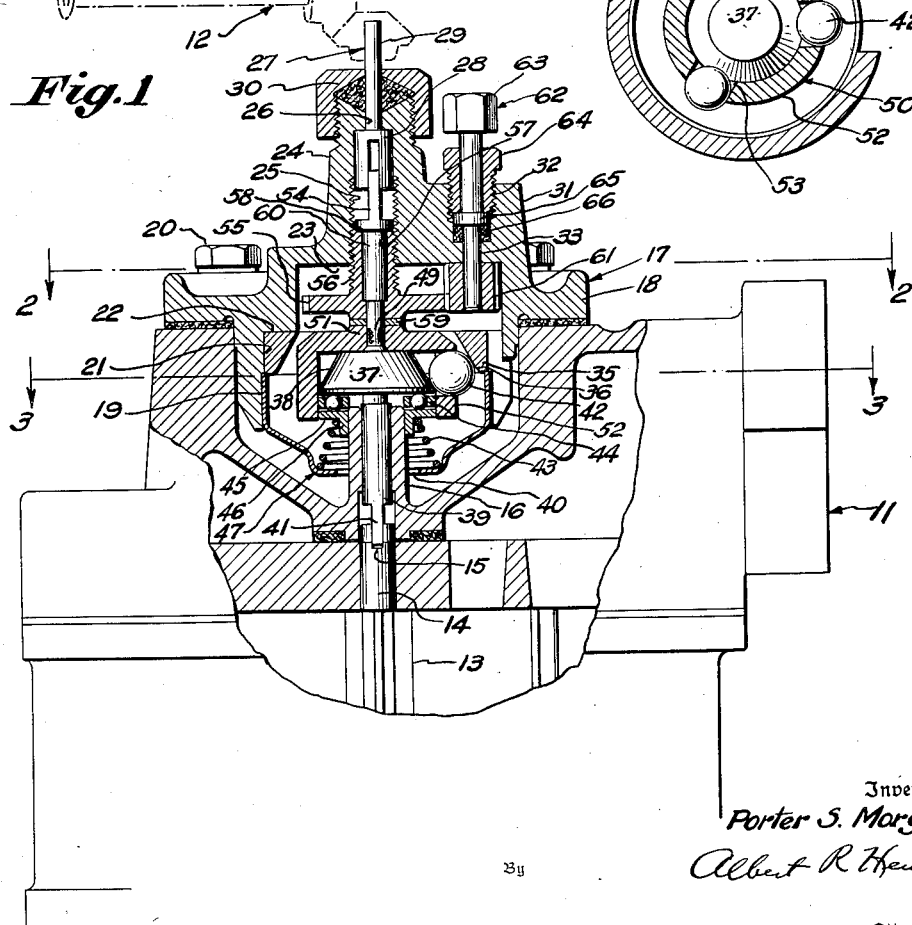
Inventor
Porter S. Morgan
Albert R. Henry
Attorney Patented June 25, 1935

2,005,949

UNITED STATES PATENT OFFICE 2,005,949

VERNIER FOR METER REGISTERING MECHANISM

Porter S. Morgan, New York, N. Y., assignor, by direct and mesne assignments, to Liberty Share Corporation, Buffalo, N. Y.

Original application June 3, 1932, Serial No. 615,166. Divided and this application August 10, 1934, Serial No. 739,285

3 Claims. (Cl. 74—281)

This invention relates to calibrating devices for fluid meters, and it is a division of my copending application Serial No. 615,166, filed June 3, 1932.

The invention is directed to an adjustable driving connection between a fluid operated device and a registering mechanism, which is in the form of a change speed friction drive mechanism and which is utilized to obtain the calibration of the registering mechanism with the fluid operated device by a single adjustable means.

The principles of operation of the device will be found to be similar in some respects to those disclosed in another of my copending applications, Serial No. 591,322, filed February 6, 1932, with various improvements in structure resulting in compactness, adaptability to mass production and accuracy of adjustment.

The invention is more specifically described and shown in the accompanying specification and drawing, wherein:

Fig. 1 is a vertical section through the calibrating unit and adjoining portions of a fluid meter;

Fig. 2 is a section on the line 2—2 of Fig. 1; and

Fig. 3 is a section on the line 3—3 of Fig. 1.

The calibrating unit 10 is herein shown as being associated with a liquid meter 11 and a registering unit 12, in effect to provide an adjustable variable speed transmission therebetween. The meter 11 is preferably of the type shown in my stated copending application Serial No. 615,166, being provided with a rotor or fluid actuated member 13 suitably mounted for actuation by the liquid passing through the casing of the meter. A shaft 14 secured to the rotor 13 extends through a hub 16 formed on the casing, and it is slotted as indicated by the numeral 15 to provide a connection with the mechanism of the calibrating unit.

A body 17 serves as a housing for the unit 10 and it may be formed exteriorly in any manner to provide a rigid connection with a support. For the described environment the body is formed with a circular flange 18 drilled to receive screws 20 which secure it to the meter casing. The lower face of the body contains a large recess which is the composite of a counterbore 19, a coaxial bore 21 terminating in a shoulder 22, and a smaller gear chamber 23.

The upper extremity of the body is formed with an externally threaded hub 24 which contains a tapped hole 25 entering the gear chamber and a coaxial bearing 26. A driven shaft 27 is mounted within the hub and it is formed with a slotted head 28 which is received within the hole 25, and a stem 29 which protrudes through the bearing 26 where it may be connected in any desired manner to the registering unit 12, shown diagrammatically in dotted lines in Fig. 1. A packing gland 30 is secured to the exterior of the hub and suitably formed to seal the bearing 26. A second hub 31 is disposed in parallelism to the hub 24 and it contains a tapped hole 32 and a bearing 33 entering the gear chamber 23 for purposes hereinafter described.

The driving connection between the shaft 14 and the driven shaft 27 is roughly in the form of a ball bearing, the outer race 35 of which is pressed into the counterbore 21 and is formed with an internal conical face 36. The inner race or cone 37 is formed with a conical face 38, which is preferably parallel to the face 36 of the outer race. This race is also provided with a shaft portion 39 which is rotatably mounted within the casing hub 16 and which terminates in a key portion 41, adapted to fit in the slot 15 of the rotor shaft 14.

A plurality of drive balls 42 are mounted between the conical surfaces of the races and a positive frictional engagement is insured by the provision of a spring 43 which urges the inner race upward into contact with the balls. A thrust bearing 44 and a superimposed bushing 45 are interposed between the spring and inner race 37, the latter member being formed with a depending sleeve 46, which is rotatably mounted on the hub 16 and which is engaged by the upper extremity of the spring. The lower extremity of the spring is received in a retainer cup 47 which is provided with a split skirt 48 to facilitate the operation of pressing it into the bore 21 and which is also formed with a central clearance hole 40 engaging over the hub 16.

The drive balls 42 are retained in axial alignment by a ball cage 50 which is formed with a hub portion 51 and a depending annular flange 52 containing radial ball receiving pockets 53. The hub portion 51 is drilled to receive the knurled end 49 of a coupling 60, the remaining extremity of which is provided with a key portion 54 adapted to be telescopically received within the slot of the driven shaft 27. The inner periphery of the flange 52 slidably receives both the bearing 44 and bushing 45.

The cage 50 is axially adjustable so that the balls therein may be positioned in various radial planes within the confines of their races. The adjustment means for the cage comprises a gear 55 having an externally threaded hub 56 in engagement with the tapped hole 25 of the body hub 24, and also having an axial bearing portion 51 for rotatably receiving the coupling 53. The coupling is secured against axial movement relative to the gear 55 by a shoulder 58 formed thereon and abutting the upper end of the hub 56. A bearing washer 59 may be interposed between the lower face of the gear and the adjacent hub 51 of the cage 50.

A pinion 61 meshes with the gear 55 and it is secured to an adjusting shaft 62 which extends upward through the bearing 33 of the body hub 31 and terminates in a head 63. A packing nut 64 is rotatably mounted on the shaft 62 and received in the tapped hole 32. A collar 65, secured to the shaft 62, is engageable by the nut 64 and in turn is formed to engage a packing 66 disposed in the hole 32 to seal the bearing 33.

In operation, it will be apparent that the calibrating unit 10 functions as an adjustable transmission between the driving and driven shafts, since, by turning the adjusting shaft 62, the gear 55 is actuated to raise or lower the cage 50. This results in an increase or decrease in the diameter of the ball pitch circle and the resulting alteration of the planetary speed of the balls and accompanying cage. Thus the speed ratio between the shafts may be varied within the range of the change in the pitch circle diameter.

The motive parts of the unit are accessible for replacement or repair through the open bottom of the body, wherein by simply disengaging the cup 47, the cone and accompanying parts may be removed.

When the calibrating unit is used with a liquid meter, as illustrated, it greatly simplifies the process of calibrating the registering mechanism with the fluid actuated element of the meter. During this adjustment a quantity of liquid is dispensed through the meter, measured, and checked against the indicated amount on the registering mechanism. Any noted discrepancies may then be compensated for by manipulating the adjusting shaft, and the process may be repeated until the registering mechanism accurately indicates the volume of liquid passed through the meter. Previously, this adjustment, or calibration, was performed by changing sets of gears until an approximate accuracy was obtained. This was not only a tedious and expensive operation, but one in which the final adjustment was dependent upon the remote chance of obtaining an exact gear ratio.

It will be understood that the foregoing description of a typical embodiment of the invention is intended to be exemplary of its principles of operation, and it is not intended to limit the scope thereof, which is set forth in the following claims.

I claim:

1. In a change speed drive mechanism, a body, a race member secured to the body and having an internal conical face, a cone adapted to be secured to a driving shaft and having a conical face, a plurality of balls between the race member and cone, a cup removably secured to the body, a spring having one end mounted on the cup, a thrust bearing interposed between the remaining end of the spring and said cone, said spring retaining the cone in frictional engagement with the balls, a cage adapted to be connected to a driven shaft and formed with pockets receiving the balls, and means mounted on the body for adjusting the cage axially relative to the race and cone.

2. In a change speed drive mechanism, a body, a race member secured to the body and having an internal conical face, a cone adapted to be secured to a driving shaft and having a conical face, a plurality of balls between the race member and cone, resilient means mounted in the body for retaining the cone in contact with the balls, a ball cage formed with pockets for receiving said balls, a shaft secured axially to the cage and formed for connection with a driven shaft, means for adjusting the cage axially relative to said race comprising a gear having a threaded hub received in the body, a bearing in the gear rotatably receiving the cage shaft, a pinion meshing with the gear, an adjusting shaft secured to the pinion and protruding through the body, said adjusting shaft being operable to adjust the axial position of the gear and accompanying cage relative to said race.

3. In a change speed drive mechanism, a body having a bearing therein, a driven shaft mounted in the bearing, a race member secured to the body and having an internal conical face, a cone adapted to be secured to a driving shaft and having a conical face, a plurality of balls between the race member and cone, resilient means mounted in the body for retaining the cone in contact with the balls, a ball cage formed with pockets for receiving said balls, a shaft secured to the cage and having a sliding keyed connection with the driven shaft, a gear having a threaded hub mounted in the body and a bearing for rotatably receiving said cage shaft, cooperating means on the bearing and cage shaft for retaining the cage against axial movement relative to said gear, a pinion meshing with the gear, and an adjusting shaft secured to the pinion extending through the body, said adjusting shaft being operable to adjust the axial position of the gear and accompanying cage relative to the race.

PORTER S. MORGAN.